United States Patent [19]
McMillan

[11] 3,726,060
[45] Apr. 10, 1973

[54] APPARATUS FOR ENCASING PRODUCT
[76] Inventor: Allen G. McMillan, Route One, Munford, Ala. 36268
[22] Filed: June 23, 1971
[21] Appl. No.: 155,942

[52] U.S. Cl............................53/138 A, 53/183
[51] Int. Cl.......................B65b 51/04, B65b 39/06
[58] Field of Search..................53/138 A, 183, 184, 53/193, 249, 255, 258, 270, 390, 391

[56] References Cited

UNITED STATES PATENTS 2,908,123  10/1959  Muller et al. .................53/193 X
3,650,298  3/1972   Delmar........................53/197 X Primary Examiner—Robert L. Spruill
Attorney—Jennings, Carter & Thompson

[57] ABSTRACT

Product encasing apparatus having housing which supports casing for longitudinal movement along outer surface thereof with a passageway through housing for passing casing. Products passed sequentially through passageway and move inwardly of casing. Conveyor adjacent discharge end of passageway receives casing with products therein and draws same away from housing. Securing means retains casing closed at both ends of each product and casing is severed between securing means located between adjacent products.

5 Claims, 3 Drawing Figures

PATENTED APR 10 1973
3,726,060
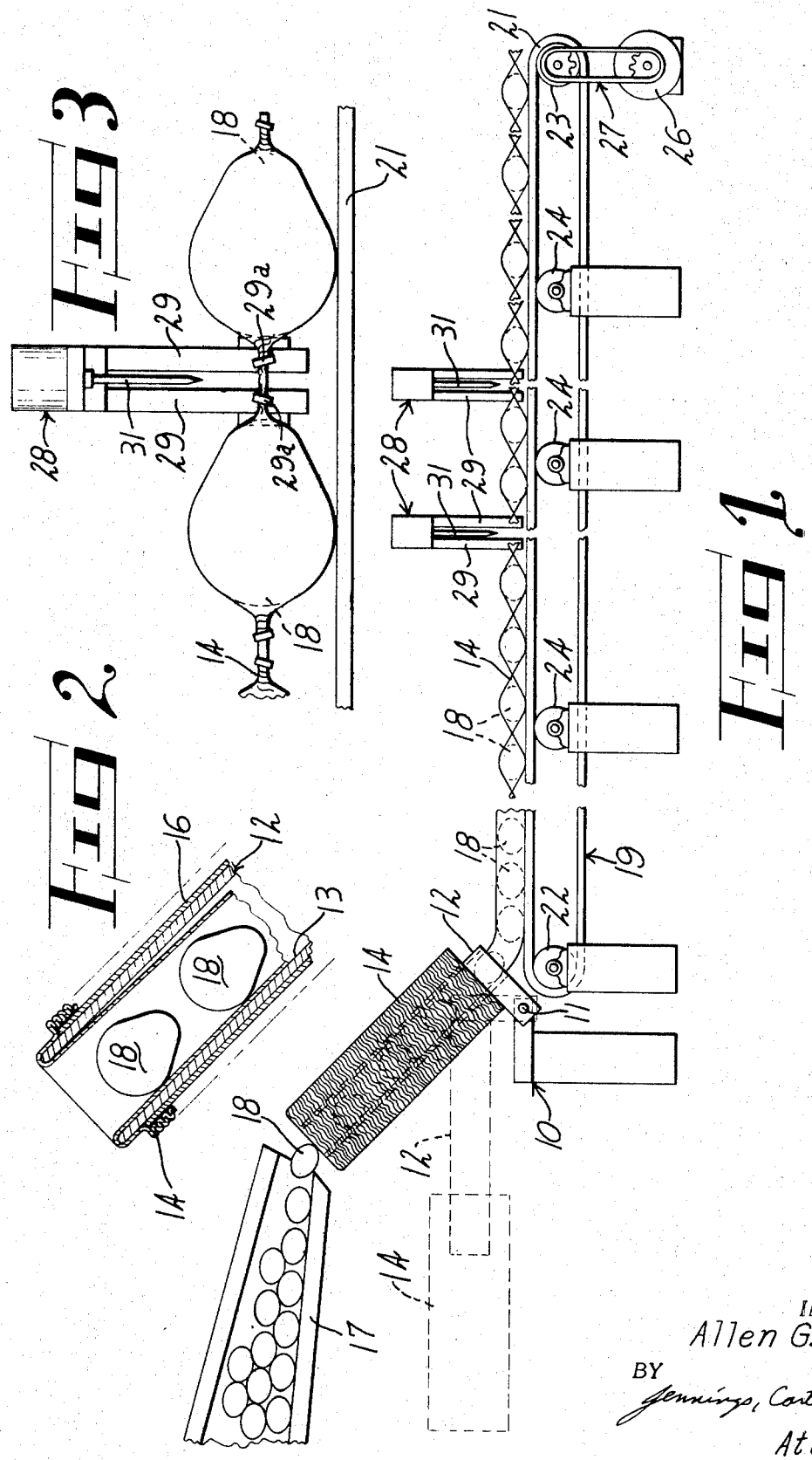
INVENTOR.
Allen G. McMillan
BY
Jennings, Carter & Thompson
Attorneys

APPARATUS FOR ENCASING PRODUCT

BACKGROUND OF THE INVENTION

This invention relates to apparatus for encasing a product with a tubular casing and is particularly adapted for packaging meat products, such as hams, with a tubular casing which may be in the form of a plastic material, a tubular knitted material or other suitable flexible material.

My apparatus is an improvement over the apparatus disclosed and claimed in my U.S. Pat. No. 3,555,775 dated Jan. 19, 1971.

As is well known in the art to which my invention relates, many devices have been proposed for packaging products within a tubular casing. Such apparatus is often complicated in structure and requires that the products be forced or placed inwardly of the casing and then subsequently the ends of the casing are sealed, thus requiring a considerable amount of time and effort to package the products.

BRIEF SUMMARY OF THE INVENTION

In accordance with my present invention, I supply the tubular casing continuously from a support member whereby the casing moves longitudinally relative to the other surface of the support member and then passes inwardly through a passageway in the support member. The products to be packaged are fed sequentially through the passageway so that the products move inwardly of the casing in tandem arrangement. Conveyor means at the discharge end of the passageway receives the casing with the products therein and draws the casing with the products therein away from the discharge end of the passageway. Securing elements retain the casing closed adjacent both ends of the product while the casing is severed between adjacent securing elements and between adjacent products.

Apparatus embodying features of my invention is illustrated in the accompanying drawing, forming a part of this application, in which:

FIG. 1 is a side elevational view, partly broken away, showing my improved apparatus;

FIG. 2 is an enlarged, fragmental, sectional view showing the receiving end of the passageway for passing the casing and the products encased therein; and, FIG. 3 is an enlarged, fragmental view showing the securing means which retains the casing closed adjacent both ends of the product and the means for severing the casing therebetween.

Referring now to the drawing for a better understanding of my invention, I show a supporting frame 10. Mounted for pivotal movement on the supporting frame 10 by a suitable pivot shaft 11 is the lower end of an elongated support member 12 which is in the form of an elongated tube-like housing having a passageway 13 therethrough. The support member 12 supports a flexible tubular casing 14 for longitudinal movement along the outer surface of the support member as the casing passes in a first direction and then passes in a reverse direction into the passageway 13, as shown in FIG. 2. The flexible tubular casing is gathered or shirred onto a sleeve-like member 16 and then moves from the sleeve-like member 16 along the outer surface of the support member 12 and then inwardly of the opening 13 whereby a continuous supply of the tubular casing 14 is provided.

The products to be encased within the casing 12 are delivered to the receiving end of the passageway 13 by a feed chute 17 whereby the products, such as hams 18, are fed sequentially through the passageway 13 whereby the products move inwardly of the casing in tandem arrangement and are discharged at the discharge end of passageway 13. As shown in FIGS. 1 and 2, the support member 12 is inclined whereby it slopes at an angle of approximately 45° relative to the horizontal. By sloping the support member 12, the products 18 are conveyed partially by gravity as they pass through the passageway 13.

Mounted adjacent the discharge end of the passageway 13 is an elongated conveyor unit 19 which is in the form of an endless conveyor belt 21 which passes around pulleys 22 and 23 adjacent opposite ends of the conveyor unit. Suitable idler pulleys 24 support intermediate portions of the endless belt conveyor 21. The pulley 23 is a drive pulley and is driven by a motor 26 through a suitable flexible drive indicated generally at 27. The endless conveyor belt 21 receives the casing with the tandem arranged products 18 therein and draws the casing with the products therein away from the discharge end of passageway 13 whereby the drawing or pulling action of the conveyor in addition to the movement of the products 18 by gravity through the passageway 13 causes the products to move in a uniform and continuous manner from the passageway onto the conveyor.

As the casing 14 with the products 18 therein travels along the conveyor belt 21, alternate ones of the products are turned in opposite directions to apply twist between adjacent products 18. After twist is applied between the products 18, the products pass a securing and retaining unit 28 which comprises a pair of spaced apart clipping members 29 between adjacent products 18. The clipping members apply a pair of deformed clips 29a around the twisted portion of the casing 14 whereby the deformed clips frictionally engage the casing to close the casing about the adjacent ends of the products 18. As shown in FIG. 1, the conveyor belt 21 is of a length to support a plurality of the tandem arranged products 18 prior to reaching the securing and retaining units 28. Preferably, two or more of the securing and retaining units 28 are provided whereby each securing and retaining unit 28 applies the clips 29a between alternate twisted portions of the casing 14. Also, additional securing and retaining units 28 may be employed to assure that clips are applied between all products 18 prior to leaving the conveyor belt 21.

Each securing and retaining unit is provided with a cutter element 31 for severing the casing 14 between adjacent securing clips 29a whereby adjacent products 18 are separated from each other after the clips 29a have been applied to the casing.

From the foregoing description, the operation of my improved apparatus will be readily understood. The shirred, flexible casing 14 mounted on the sleeve-like member 16 is positioned over the tube-like housing 12 whereby the casing 14 moves longitudinally along the outer surface of the housing 12 toward the receiving end of the passageway 13. The casing 14 then passes downwardly through the passageway 13. The products to be encased are introduced sequentially from the feed hopper 17 into the passageway 13 whereby they move inwardly of the casing and pass onto the receiving end of the conveyor belt 21. The conveyor belt 21 being of a length to support a plurality of products 18 prior to reaching the securing and retaining units 28, pulls or draws the casing with the products encased therein from the support member 12 whereby the casing and products are continuously moved along the conveyor belt toward the securing and retaining units 28.

Alternate ones of the products 18 are twisted in opposite directions to thus apply twist between the adjacent products 18 prior to reaching the securing and retaining units 28. As the twisted portions of the casing 14 move between the securing and retaining units 28, the deformed clips 29a are applied in spaced relation to each other between adjacent products 18. Immediately upon application of the clips 29a, the cutter element 31 is energized to sever the casing between adjacent clips 29a to thus separate adjacent products 18 from each other. By providing at least two securing and retaining units 28, the conveyor 21 can draw the casing and products from the passageway 13 at a greater speed, thus increasing production. Accordingly, each of the securing and retaining units 28 would apply clips 29a to alternate twisted portions between the products 18.

From the foregoing, it will be seen that I have devised an improved apparatus for continuously encasing products moving in tandem arrangement. By drawing the casing with the products encased therein along the conveyor belt, the casing and products are removed from the passageway 13 in a uniform and continuous manner to provide for troublefree operation. Also, by inclining the support member 12 whereby the products 18 move down an inclined surface toward the conveyor, I further assure smooth operation of the apparatus at all times. Furthermore, by applying clips between adjacent products 18 and then severing the casing between the applied clips, my apparatus is adapted to handle the products as they pass in a continuous manner through my improved apparatus.

While I have shown my invention in but one form, it will be obvious to those skilled in the art that it is not so limited, but is susceptible of various other changes and modifications without departing from the spirit thereof.

What I claim is:

1. Apparatus for encasing a product with a flexible tubular casing comprising:
   a. a support member disposed to support a flexible tubular casing for longitudinal movement in a first direction along its outer surface and having a longitudinally extending passageway therethrough for passing said casing in a reverse direction to said first direction after movement in said first direction with said passageway having a receiving end and a discharge end,
   b. means introducing products to be encased sequentially into said receiving end of said passageway in direct contact with said casing at said receiving end so that said products are moved through said passageway in said reverse direction by said casing in tandem arrangement and are discharged therewith at the discharge end of said passageway,
   c. conveyor means adjacent the discharge end of said passageway receiving said casing with the tandem arranged products therein and drawing said casing with the products therein through said passageway and away from said discharge end of said passageway,
   d. securing means retaining said casing closed adjacent both ends of each of said products, and
   e. means severing said casing between adjacent securing means located between adjacent products whereby adjacent products are separated from each other.

2. Apparatus for encasing a product with a flexible tubular casing as defined in claim 1 in which said conveyor means comprises an elongated conveyor of a length to support a plurality of said tandem arranged products prior to severing said casing.

3. Apparatus for encasing a product with a flexible tubular casing as defined in claim 1 in which said securing means retaining said casing closed comprises:
   a. a pair of spaced apart clipping members between adjacent products disposed to apply a pair of deformed clips around said casing and in frictional engagement therewith.

4. Apparatus for encasing a product with a flexible tubular casing as defined in claim 3 in which the means severing said casing comprises a cutter mounted for movement intermediate said spaced apart clipping members.

5. Apparatus for encasing a product with a flexible tubular casing as defined in claim 1 in which said support member is a tube-like housing which slopes downwardly toward the receiving end of said conveyor means.

* * * * *